United States Patent [19]

Schoeffter

[11] Patent Number: 5,261,632
[45] Date of Patent: Nov. 16, 1993

[54] ROTARY MECHANISM OF A SPACE VEHICLE HAVING AN INTEGRATED STACKING SYSTEM

[75] Inventor: Jean-Pierre Schoeffter, Mouans Sartoux, France

[73] Assignee: AEROSPATIALE Societe Nationale Industrielle, France

[21] Appl. No.: 770,651

[22] Filed: Oct. 3, 1991

[30] Foreign Application Priority Data

Oct. 15, 1990 [FR] France ................. 90 12677

[51] Int. Cl.$^5$ ................................................ B64G 1/44
[52] U.S. Cl. ................................................ 244/173
[58] Field of Search ............... 244/158 R, 173; 60/527–530; 188/1 R

[56] References Cited

U.S. PATENT DOCUMENTS

| 3,860,169 | 1/1975 | Norman | 60/527 |
| 3,985,209 | 10/1976 | Glassow | 188/1 R |
| 3,989,417 | 11/1976 | Neidigh | 60/527 |
| 4,081,963 | 4/1978 | Stove | 60/528 |
| 4,290,168 | 9/1981 | Binge | 244/173 |
| 4,509,328 | 4/1985 | Holzer | 60/528 |
| 4,561,614 | 12/1985 | Olikara et al. | 244/173 |
| 4,961,654 | 10/1990 | Pangburn et al. | 384/517 |

FOREIGN PATENT DOCUMENTS

| 0207698 | 1/1987 | European Pat. Off. |
| 56-150614 | 3/1982 | Japan. |
| 2069629 | 8/1981 | United Kingdom. |

Primary Examiner—Galen Barefoot
Attorney, Agent, or Firm—Hayes, Soloway, Hennessey & Hage

[57] ABSTRACT

A rotary mechanism for use on space vehicles is provided, which mechanism comprises one or more bearings and stacking means. The bearings and stacking means join an inner and outer part so as to prevent the parts' rotary motion relative to each other, during launch phase, but permit such rotary motion thereafter. The use of the instant invention advantageously make it possible for forces produced during launch of the vehicle to be transmitted directly from one part to the other without loading the bearings, thereby permitting reduction in the size and weight of the bearings without any corresponding diminution of functionality.

18 Claims, 1 Drawing Sheet

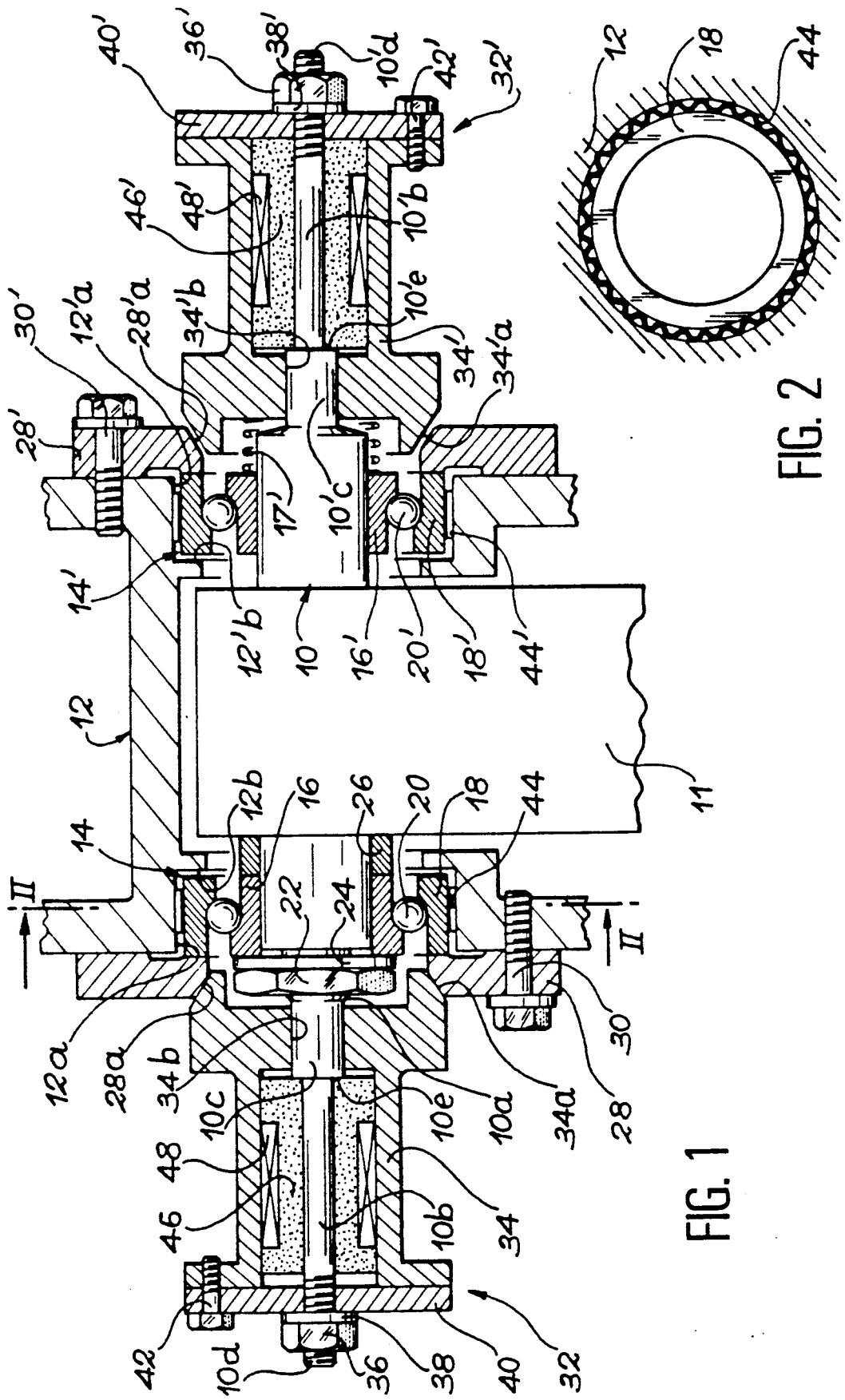

ROTARY MECHANISM OF A SPACE VEHICLE HAVING AN INTEGRATED STACKING SYSTEM

FIELD OF THE INVENTION

The invention relates to a rotary mechanism constituting part of a space vehicle or which is carried by the latter, said mechanism being equipped with integrated stacking means preventing any rotation during the vehicle launch phase, but which can then be released in order to permit the normal operation of said mechanism.

BRIEF DESCRIPTION OF THE PRIOR ART

Space vehicles, such as artificial satellites and orbiting space stations, have equipments such as solar panels, antennas, etc., which comprise mechanisms permitting relative rotations between the parts forming the same when the vehicle is in orbit. Usually these mechanisms incorporate ball bearings, but can also have screw/nut systems or other types of bearings.

During the launch of space vehicles, said different mechanisms are subject to high mechanical stresses. In the case of ball bearings, the forces are transmitted from one ring to the other by passing through the balls. The presence or appearance of a clearance during this launch phase will consequently lead to shocks or impacts between the balls and the rings, so that surface deteriorations occur and in the long term could lead to an unsatisfactory operation or even a deterioration of the bearing.

In order to prevent any clearance between these mechanisms during launch, conventionally a preload is applied thereto. However, this absence of clearance may no longer be necessary in the operational mode and may constitute a constraint penalizing the performances of the mechanism.

In addition, the dimensional characteristics of bearings are determined by specialists as a function of the maximum loads which they withstand. In the case of a bearing carried by a spacecraft, the importance of the forces applied thereto at the time of launch make it necessary to give said bearing dimensions and consequently a weight which are not generally acceptable for such a craft.

Therefore it is also conventional practice to link the moving parts of the mechanisms, or the elements connected to said parts, by a rigid stacking member by which are transmitted part of the loads produced during launch. This rigid member is broken by a pyrotechnic control when the space vehicle arrives under operating conditions. However, the use of a pyrotechnic control does not make it possible to place the stacking member in the immediate vicinity of the bearing, so that a not insignificant part of the loads produced during the launch continue to pass through the latter. The size and weight of the bearing can consequently not be optimized, which constitutes a significant handicap, bearing in mind the interest of reducing volume and weight in a space vehicle.

SUMMARY OF THE INVENTION

The present invention specifically relates to a rotary mechanism for a space vehicle, whose stacking means are released without it being necessary to use a pyrotechnic control, which permits the integration of the stacking means in the mechanism and the placing thereof in the immediate vicinity of the rings of bearings in the case where the mechanism comprises such bearings. The loads which pass through the contacting surfaces of the rotary mechanism during the launch phase are consequently substantially eliminated, so that in the case where the mechanism comprises bearings, the size and weight of the latter are significantly reduced compared with existing mechanisms and a clearance or a very small preload can be applied at random to the mechanism in the operational mode.

According to the invention this result is obtained by means of a rotary mechanism of a space vehicle, which comprises an internal part and an external part which, following a vehicle launch phase, can be given a relative rotary movement, said mechanism comprising stacking means preventing any relative rotation between said parts during the launch phase and means for releasing the stacking means following the launch phase, characterized in that the release means comprise a member made from a shape memory material controlling the release of the stacking means, on clearing a phase change temperature of said material.

The use of a member made from a shape memory material for ensuring the release of the stacking means makes it possible to place the latter within the rotary mechanism and in the immediate vicinity of the contacting surfaces thereof. The loads transmitted by the latter during the space vehicle launch phase are consequently substantially eliminated, so that its dimensions and characteristics can be determined whilst taking account solely of the load which it withstands in the operational mode. Therefore its size and mass can be minimized, which is a significant advantage in a space vehicle. Moreover, the mechanism can be designed so as to have a clearance or a very limited preload in the operational mode, in order to satisfy the imposed operational conditions.

It is pointed out that a shape memory material is a memory having two stable crystalline phases, respectively an austenitic and a martensitic phase, as a function of whether its temperature is above or below the structural transformation temperature characterizing said material. When the material in the martensitic phase is exposed to a mechanical stress, it is plastically deformed and maintains this deformation for as long as the temperature remains below its phase change or structural transformation temperature. As soon as the temperature rises above this threshold, the structure becomes austenitic again and the material assumes its initial shape.

The shape change of the material produced by the clearing of the phase change temperature can consist of an elongation. The shape memory material member then acts like a jack which, prior to launch, is calibrated to a calculated dimension for which the stacking of the mechanism is possible.

The heating of the shape memory material, which can be ensured either by a heating means such as an electrical resistor positioned in the vicinity of the shape memory material member, or by solar energy, elongates the said member, which has the effect of giving the mechanism its freedom of rotation.

In a preferred embodiment of the invention, at least one bearing incorporating an inner ring and an outer ring is placed between the parts and the stacking means act directly on the inner and outer rings of said bearing, which can in particular be a ball bearing.

The stacking means can then comprise a sleeve, which is arranged concentrically around an extension of the inner part, so as to be axially compressed between the outer ring of the bearing and locking means bearing on the inner part, which supports the inner ring of the bearing.

In this case, the shape memory material member is mounted between the sleeve and the extension of the inner part, so as to bear on said extension in order to control its elongation, on clearing the phase change temperature.

Advantageously, the sleeve bears on the outer ring of the bearing via an end plate fixed to the outer part, the sleeve and the end plate cooperating by complimentary conical bearing surfaces. The sleeve also cooperates by a bore with a cylindrical bearing surface formed on a portion of the extension of the inner part located in the immediate vicinity of the bearing.

Moreover, in order to facilitate the decoupling between the outer part and the outer ring of the bearing, the latter is fitted in a bore of the outer part via an elastic decoupling joint.

In a preferred embodiment of the invention, the mechanism comprises two bearings each having an outer ring and an inner ring, stacking means mounted in opposition and acting directly between each of the outer rings and the inner part to which is fixed one of the inner rings, the other inner ring being able to slide axially on the inner part and two shape memory material members, which are respectively associated with each of the stacking means.

BRIEF DESCRIPTION OF THE DRAWINGS

The invention is described in greater detail hereinafter relative to non-limitative embodiments and the attached drawings, wherein show:

FIG. 1 A longitudinal sectional view of a rotary mechanism carried by a spacecraft, equipped with two ball bearings having an axial clearance and a radial clearance in the operational mode, a stacking device being associated with each of these bearings, the device located on the left-hand side of the drawing being shown in the stacking configuration which it occupies during launch and the device to the right being shown in the released configuration which it occupies in the operational mode.

FIG. 2 A sectional view along line II—II in FIG. 1.

DETAILED DESCRIPTION OF THE PREFERRED EMBODIMENTS

The mechanism shown in FIG. 1 is e.g. a hinge or articulation of a solar panel, an antenna or any other mechanism equipping a satellite or orbiting station. This articulation comprises a shaft 10, which is assumed to be fixed in the represented embodiment, and an outer fork or yoke 12 mounted so as to rotate on the shaft 10 via two ball bearings 14, 14', which are located on either side of a fixed fork or yoke 11 integral with the shaft 10.

Each of the bearings 14, 14' respectively incorporates an inner ring 16, 16', an outer ring 18, 18' and balls 20, 20' rolling between the rings. The inner ring 16 of the bearing 14 is locked on the shaft 10 by means of a nut 22 screwed onto a threaded part 10a of the shaft 10 and acting on the inner ring 16 via a thrust washer 24, a spacer 26 being interposed between the inner ring 16 and the fixed yoke 11.

The inner ring 16' of the bearing 14' is mounted on the shaft 10 by a sliding fitting enabling it to move axially on the shaft 10 in order to take account of expansions, whilst making the ring 16' integral in rotation with the shaft 10.

A helical compression spring 17', whose arrangement will be described in greater detail hereinafter, bears on the lateral face of the inner ring 16' opposite to the fixed yoke 11, in order to exert on said ring a slight prestress permanently maintaining it in position within the outer ring 18'.

Each of the outer rings 18, 18' of the bearings 14, 14' is mounted in a bore 12a, 12'a of the rotary yoke 12, between a shoulder 12b, 12'b, formed in said bore and an end plate 28, 28' fixed to the corresponding outer face of the rotary yoke 12, e.g. by means of screws 30, 30'. This fitting is such that the outer rings, 18, 18' have a very slight clearance parallel to the axis of the shaft 10 (approximately 0.01 mm) and a much larger clearance in a direction oriented radially with respect to the said axis (approximately 1 mm).

In the part of its outer surface facing the corresponding outer ring 18, 18', each of the end plates 28, 28' has a female conical bearing surface 28a, 28'a. When the end plates 28, 28' are fixed to the rotary yoke 12, the conical bearing surfaces 28a, 28'a are perfectly concentric to the bore 12a, 12'a formed in said yoke (concentricity approximately 0.005 mm).

According to the invention, stacking means 32, 32' installed in opposition are directly associated with the bearings 14, 14', so that all forces produced during the launch pass between the shaft 10 and the yoke 12 through said stacking means and not through the balls 20, 20' of the bearings.

Each of the stacking means 32, 32' comprises a cylindrical sleeve 34, 34', which is concentrically arranged around a reduced diameter extension 10b, 10'b of the shaft 10. At its end adjacent to the end plate 28, 28', each of the sleeves 34, 34' has a male conical bearing surface complimentary of the female conical bearing surface 28a, 28'a of the corresponding end plate. The same end of each of the sleeves 34, 34' is traversed by a bore 34b, 34'b, which is received without clearance on a portion of the extension 10b, 10'b of the shaft 10 forming a cylindrical bearing surface 10c, 10'c. The bore 34b, 34'b and the cylindrical bearing surface 10c, 10'c are given an adequate treatment to prevent jamming or seizing.

The machining of each of the sleeves 34, 34' is carried out in such a way that the conical bearing surfaces 34a, 34'a are perfectly concentric to the shaft 10, when the sleeves are mounted on said shaft.

As illustrated by FIG. 1, the spring 17' is interposed between the inner ring 16' of the bearing 14' and the bottom of counterbore formed on the facing face of the sleeve 34'.

Each of the stacking means 32, 32' also has locking means bearing on the shaft 10 in order to exert on the sleeves 34, 34' an axial force applying the conical bearing surfaces 34a, 34'a of the sleeves to the conical bearing surfaces 28a, 28'a of the end plates 28, 28'.

In the embodiment illustrated in FIG. 1, these locking means comprise a nut 36, 36' screwed onto the threaded end 10d, 10'd of the extension 10b, 10'b of the shaft 10. The nut 36, 36' also bears via a thrust washer 38, 38' on a plate 40, 40' fixed to the end of the sleeve 34, 34' turned towards the outside of the mechanism, e.g. by means of screws 42, 42'.

Under the effect of the cooperation of the conical bearing surfaces 28a, 34a on the one hand and 28'a and 34'a on the other, the axial force exerted by the sleeves 34, 34' on the end plates 28, 28' during the tightening of the nuts 36, 36' is transformed into a radial force. This radial force simultaneously has the effect of making concentric the fixed inner ring 16, 16' and the mobile outer rings 18, 18', whilst joining them together.

In precision bearings, the radial clearance between the outer ring of the bearing and the bore in which said ring is received is limited to a very low value, generally equal to or below 10 μm. In the present case, such a clearance would lead to a hyperstatic assembly. For this reason, it has been shown that the outer rings 18, 18' of the bearings are received with a significant radial clearance (approximately 1 mm) in the bores 12a, 12'a. This large radial clearance makes it possible to place between each of the outer rings 18, 18' and the corresponding bore 12a, 12'a an elastic joint 44, 44', whose shape is more particularly apparent from FIG. 2. This elastic precision joint, known as a Borelly ring, is constituted by a metal strip which meanders between the bore 12a, 12'a and the outer surface of the outer ring 18, 18'.

The elastic joints 44, 44' have the property of decoupling the outer rings 18, 18' and the balls 20, 20', when the mechanism is subject to vibrations. Therefore the loads due to the launch pass from the mobile yoke 12 to the fixed yoke 11 integral with the shaft 10 without passing through the balls 20, 20' rolling between the fixed ring 16, 16' and mobile ring 18, 18' of the bearings.

However, the elastic joints 44, 44' are sufficiently rigid to ensure the necessary stiffness and positioning precision under the effect of orbital stresses. Thus, the loads induced by the orbital stresses are very small compared with the loads produced during launch.

Each of the stacking means 32, 32' is equipped with release means permitting, in the operational phase, the elimination of the action of these stacking means.

According to the invention, these release means comprise a member in the form of a tubular spacer 46, 46' made from a shape memory material. Each of these tubular spacers 46, 46' is placed coaxially within the sleeve 34, 34' around the extension 10b, 10'b of the shaft 10 between the plate 40, 40' and a shoulder 10e, 10'e formed on the shaft 10 between the extension 10b and the cylindrical bearing surface 10c.

The left-hand side of FIG. 1 illustrates the fitting position on the ground of the mechanism, which remains unchanged throughout the launch of the spacecraft on which said mechanism is installed. In this position, there is an axial clearance between the tubular spacer 46, 46' and the sleeve 34, 34'. Therefore, the axial force necessary for eliminating the relative movement between the fixed and mobile yokes 11, 12 obtained by the tightening of the nut 36, 36' is not withstood by the shape memory material spacer 46, 46'.

For the production of the tubular spacer 46, 46' use is made of an appropriate shape memory material, as a function of the use conditions, whilst taking particular account of the phase change temperature of the alloy. In an in no way limitative manner, reference is made to shape memory materials usable within the scope of the invention, namely iron-based alloys (Fe-C, Fe-Cr, Fe,Ni, etc.), copper or noble metal alloys (Cu-Zn, Cu-Sn, Cu-Al, Cu-Zn-Al, Cu-Zn-Al-Ni, Cu-Al-Ni, Ag-Cd, Au-Cd, etc.), titanium and/or nickel-based alloys (Ni-Ti, Ni-Ti-Fe, Ni-Al, etc.) and certain pure metals (Co, Ti, Na).

In the embodiment illustrated in the drawings, the heating of the tubular spacer 46, 46' up to the transformation temperature of the shape memory material is obtained by means of a heating device, e.g. constituted by an electrical resistor 48, 48' wound directly around the spacer 46, 46'. Not shown electrical conductors make it possible to connect said resistor 48, 48' to a not shown electric current source carried by the vehicle, via a not shown switch, which is open during launch.

When a close order for said switch is given, the spacer 46, 46' made from the shape memory material is heated to a temperature above its structural transformation temperature. Therefore the structure of this material becomes austenitic again, which has the effect of making it reassume its initial shape which, in this case, corresponds to a greater length of the spacer 46, 46'.

As illustrated to the right in FIG. 1, an adequate dimensioning of the different parts constituting the mechanism has the effect, during the elongation of each of the spacers 46, 46', of bringing about a permanent elongation of the extension 10b, of the shaft 10 as a result of the bearing of the spacer 46, 46' on the plates 40, 40' and on the shoulders 10e, 10'e. This extension of each of the extensions 10b, 10'b of the shaft 10 is checked by giving to said extensions a calibrated reduced diameter compared with the normal diameter of the shaft 10

Under the effect of this permanent elongation of the extensions 10b, 10'b of the shaft 10, the stress initially applied between the fixed and mobile yokes 11, 12 respectively is released and a clearance appears between the conical bearing surfaces 28a, 34a on the one hand and 28b, 34b on the other of the sleeve 34, 34' and the end plate 28, 28'.

Obviously, the assembly described hereinbefore can be reversed, i.e. the shaft 10 can be a rotary shaft and the yoke 12 a fixed yoke. The stacking means 32, 32', as well as the means for releasing them constituted by the shape memory material spacers 46, 46' are used in the same way in association with each of the bearings 14, 14'.

According to the invention, using simple means with limited dimensions a very effective rotary stacking mechanism is obtained, more particularly with respect to the bearings which it may have. This stacking on the one hand makes it possible to eliminate the conventional pyrotechnical stacking which is often necessary and on the other hand leads to a considerable dimensional and weight gain. This gain makes it possible to use bearings in configurations for which uses of this type were previously impossible. Among the configurations in which the invention permits the use of bearings, there is a case of a mechanism having to have very limited dimensions in the radial direction and the case of bearings installed in a mechanism having to withstand very significant launch loads, which would have led to unacceptable dimensions without the device according to the invention.

Moreover, the preload which previously had to be accurately applied to the mechanisms prior to launch is eliminated, so that a significant simplification to the fitting procedure is possible. Thus, the forces necessary for stacking require no accuracy.

Moreover, the advantages inherent in shape memory materials are added thereto. Thus, the reliability of a mechanism controlled in this way is complete, its operation causing neither shocks, nor pollution and its overall dimensions are small.

Obviously, the invention is not limited to the embodiments described hereinbefore and variants thereto are possible. As has been stated, its application is not limited to ball bearings. The structure of the stacking means can also differ considerably from that described, as can the shape of the shape memory material part. Moreover, the shape change of this material can in certain cases be controlled by solar energy, so that the heating means associated therewith in the embodiment described is eliminated. Finally, the relative rotation between the two parts of the mechanism can be unlimited or on the contrary can be limited to angles below 360°.

I claim:

1. Rotary mechanism for a space vehicle, comprising an inner part and an outer part which can be given, during a vehicle launch phase, a relative rotary movement, said mechanism incorporating stacking means preventing any relative rotation between said parts during the launch phase and means for releasing the stacking means after the launch phase, wherein the release means comprises a member made from a shape memory material controlling the release of the stacking means by passing from a first stable crystalline phase into a second stable crystalline phase on clearing a phase change temperature of said material.

2. Mechanism according to claim 1, wherein at least one bearing incorporating an inner ring and an outer ring is placed between the said parts, so that the stacking means acts directly on the inner and outer rings of said bearing.

3. Mechanism according to claim 2, wherein the bearing is a ball bearing.

4. Mechanism according to claim 2, wherein the stacking means comprises a sleeve arranged concentrically around an extension of the inner part, so as to be axially compressed between the outer ring of the bearing and locking means bearing on the inner part, which supports the inner ring of the bearing.

5. Mechanism according to claim 4, wherein the shape memory material member is fitted between the sleeve and the extension of the inner part, so as to bear on said extension in order to control its elongation on clearing said phase change temperature.

6. Mechanism according to claim 5, wherein heating means is also placed between the sleeve and the extension of the inner part, in order to ensure that the shape memory material member clears the said temperature when the heating means is put into operation.

7. Mechanism according to claim 4, wherein the sleeve bears on the outer ring of the bearing via an end plate fixed to the outer part, the sleeve and the end plate cooperating by complimentary conical bearing surfaces.

8. Mechanism according to claim 4, wherein the sleeve has a bore cooperating with a cylindrical bearing surface formed on a portion of the extension of the inner part in the immediate vicinity of the bearing.

9. Mechanism according to claim 2, wherein the outer ring of the bearing is fitted in a bore of the outer part via an elastic decoupling joint.

10. Mechanism according to claim 2, wherein two bearings are provided, each having an outer ring and an inner ring, there are two stacking means fitted in opposition and acting directly between each of the outer rings and the inner part to which is fixed one of the inner rings, the other inner ring being able to slide axially on the inner part and there are two shape memory material members respectively associated with each of the stacking means.

11. Rotary mechanism for a space vehicle, comprising an inner part and an outer part which can be given, during a vehicle launch phase, a relative rotary movement, said mechanism incorporating stacking means preventing any relative rotation between said parts during the launch phase and means for releasing the stacking means after the launch phase, said release means comprising a member made from a shape memory material controlling the release of the stacking means on clearing a phase change temperature of said material, at least one bearing incorporating an inner ring and an outer ring being placed between said parts so that the stacking means acts directly on the inner and outer rings of said at least one bearing, said stacking means comprising a sleeve arranged concentrically around an extension of the inner part so as to be axially compressed between the outer ring of the at least one bearing, and locking means bearing on the inner part which supports the inner ring of the at least one bearing.

12. Mechanism according to claim 11, wherein the shape memory material member is fitted between the sleeve and the extension of the inner part, so as to bear on said extension in order to control its elongation on clearing said phase change temperature.

13. Mechanism according to claim 12, wherein heating means is also placed between the sleeve and the extension of the inner part, in order to ensure that the shape memory material member clears said temperature when the heating means is put into operation.

14. Mechanism according to claim 11, wherein the sleeve bears on the outer ring of the bearing via an end plate fixed to the outer part, the sleeve and the end plate cooperating by complimentary conical bearing surfaces.

15. Mechanism according to claim 11, wherein the sleeve has a bore cooperating with a cylindrical bearing surface formed on a portion of the extension of the inner part in the immediate vicinity of the bearing.

16. Mechanism according to claim 11, wherein the outer ring of the bearing is fitted in a bore of the outer part via an elastic decoupling joint.

17. Mechanism according to claim 11, wherein two bearings are provided, each having an outer ring and an inner ring, there are two stacking means fitted in opposition and acting directly between each of the outer rings and the inner part to which is fixed one of the inner rings, the other inner ring being able to slide axially on the inner part and there are two shape memory material members respectively associated with each of the stacking means.

18. Rotary mechanism for a space vehicle, comprising an inner part and an outer part which can be given, during a vehicle launch phase, a relative rotary movement, said mechanism incorporating two stacking means preventing any relative rotation between said parts during the launch phase and means for releasing the two stacking means after the launch phase, said release means comprising two members made from a shape memory material controlling the release of the two stacking means on clearing a phase change temperature of said material, two bearings being placed between said parts, each said bearing having an outer ring and an inner ring, said two stacking means being fitted in opposition and acting directly between each of the outer rings and the inner part to which is fixed one of the inner rings, the other inner ring being able to slide axially on the inner part, said two shape memory material members respectively being associated with each of the stacking means.

* * * * *